(No Model.)
C. C. MILLER.
TESTING MACHINE.
No. 313,607.  Patented Mar. 10, 1885.
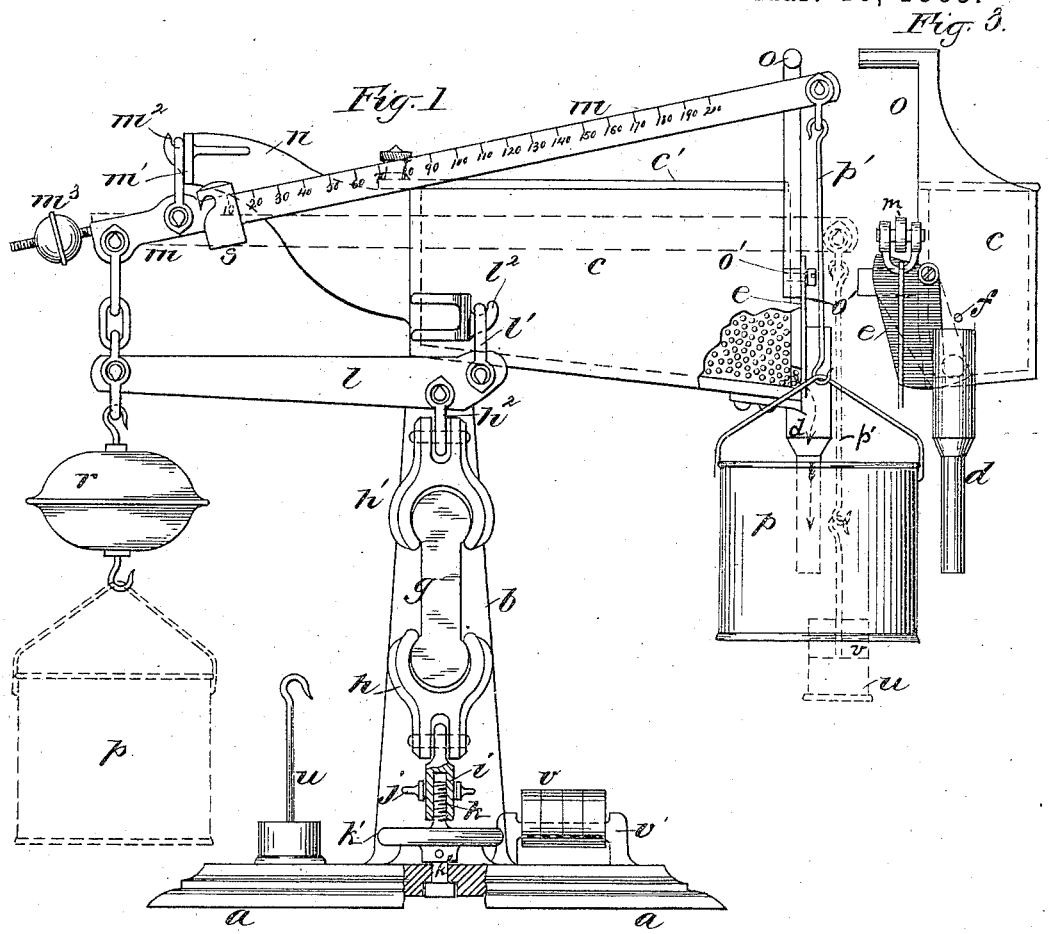
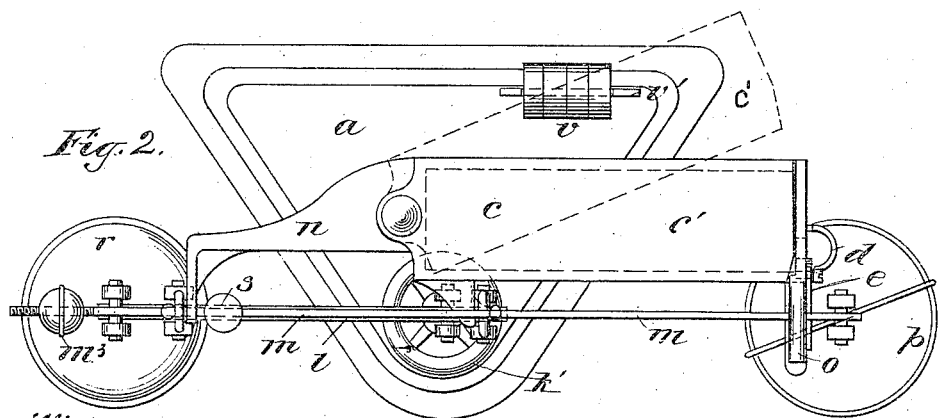
Witnesses:
Henry F. Parker
Jno. E. Gavin
Inventor:
Chas. C. Miller
by Chas. M. Higgins
Attorney.

UNITED STATES PATENT OFFICE.

CHARLES C. MILLER, OF BROOKLYN, NEW YORK, ASSIGNOR TO E. AND T. FAIRBANKS, OF ST. JOHNSBURY, VERMONT.

TESTING-MACHINE.

SPECIFICATION forming part of Letters Patent No. 313,607, dated March 10, 1885.

Application filed March 17, 1884. (No model.)

*To all whom it may concern:*

Be it known that I, CHARLES C. MILLER, of the city of Brooklyn, in the county of Kings and State of New York, assignor to E. & T. FAIRBANKS & Co., of St. Johnsbury, Vermont, have invented certain new and useful Improvements in Testing-Machines, of which the following is a specification.

My invention is more especially designed for testing small specimens of hydraulic cement for tensile strength, or for similar light work; and the object of my invention is to provide a small and simple machine for this purpose, which will be accurate in its results, and in which the test can be quickly and easily made. In this machine I employ the usual clamps in which the specimen is held, and one of these clamps connects to a straining-lever or to a system of coupled straining-levers, and on the free or terminal end of the system of levers is hung a removable weight-pan, which is placed under a spout leading from a reservoir of weighting material, preferably shot, so that when the shot is allowed to run into the pan strain will be gradually applied to the specimen until sufficient force is exerted to break the specimen, when the levers will fall and the flow of shot be stopped, and the weight in the pan will then represent the strain at which the specimen broke. The organization, so far as above described, has, however, been heretofore used; but according to my improvement in this class of machines I graduate one of the levers, preferably the terminal lever, to serve as a scale-beam, and provide the same with a movable poise, and I arrange the weighting-pan to be removable from the weighting or terminal end of the lever to the opposite end thereof, and I graduate the aforesaid lever in relation thereto, so that when the weight-pan is removed from the straining end of the graduated lever to the weighing end thereof and the poise run out on the graduated lever the actual weight which broke the specimen will be accurately indicated by the position of the poise on the graduations, thus obtaining an indication of the exact weight which broke the specimen in a simple and direct manner, and obviating the necessity of employing a separate scale to determine the weight, as has been heretofore employed with testing-machines of this class.

My invention therefore consists in the features above outlined, and also in certain other details, as hereinafter fully set forth and claimed.

In the drawings annexed, Figure 1 presents a front elevation of my improved machine, a part being broken away; and Fig. 2 is a plan view thereof. Fig. 3 is a fragmentary end elevation of the upper portion.

Referring to Figs. 1 and 2, $a$ indicates the base of the machine, which is preferably of cast-iron in the form of a triangular plate. From the center of the base-plate a standard, $b$, rises, on the top of which is supported the shot-reservoir $c$, which inclines longitudinally toward the outer or overhanging end, and also inclines transversely toward the inner corner, as shown best in Fig. 3, at which is placed the spout $d$. The spout communicates with the reservoir through an aperture in the inclined corner, as shown best in Fig. 1, which is normally covered by a pivoted slide or valve plate, $e$, moved over against a stop-pin, $f$, as indicated by dotted lines in Fig. 3, so as to prevent the shot running out and down into the spout.

Now, referring to Fig. 1, $g$ indicates the "brickett" or specimen to be tested, which is usually made in a figure of 8 shape, the central or narrow part being one square inch in cross-section, and which is first molded in the desired shape in a suitable mold, and after being dried to the desired hardness is then placed, as shown, in the ordinary form of clamp or jaws $h$ $h'$. The lower of these jaws, $h$, is jointed to a screw-sleeve, $i$, which fits between guides $j$, projecting from the lower part of the standard $b$, so as to allow the sleeve and its attached jaw a vertical movement or adjustment, but prevents the rotation of the sleeve. Into this sleeve is screwed a short screw, $k$, projecting from the center of a hand-wheel, $k'$, the hub of which rests upon the base-plate, as shown in section in Fig. 1, while the smooth end $k^2$ of the screw $k$, which forms the axle of the wheel, projects through the hub, and is keyed thereto, and is free to turn in a bearing in the base-plate, but restrained from endwise movement by a shoulder or head beneath the base-plate, as fully shown at the sectional part of Fig. 1, so that hence if the hand-wheel $k'$ be rotated one way or the other the lower clamp-jaws, $h$, will be forcibly screwed up or down. The upper clamp-jaw, $h'$, is hung from a pivotal loop, $h^2$, which is suspended from pivots on a lever, $l$, of the second order, which is itself fulcrumed on pivots in the suspending-loop $l'$, which is hung on a hook, $l^2$, projecting from the lower and inner corner of the shot-reservoir. The outer end of this lever $l$ is pivotally linked to the short arm of a second and longer lever, $m$, which is of the first order, fulcrumed on a pivot-loop, $m'$, which is hung on a hook, $m^2$, formed on the end of a bracket-arm, $n$, which projects from the back end of the shot-reservoir $c$. The long arm of this lever $m$ projects alongside of the shot-reservoir, and its front end projects beyond the front end thereof and under a projecting or overhanging hook or stop arm, $o$, which extends from the front end of the shot-reservoir and forms a stop to prevent the rise of the lever beyond a necessary height. A second stop-arm, $o'$, projects out from the end of the shot-reservoir below the tip of the beam-lever $m$, and limits the downward movement thereof.

On the free end of the lever $m$ is suspended a hooked rod, $p'$, on which is hung a pan, $p$, which normally lies under the spout, and into which the spout delivers, as illustrated, while on the end of the lever $l$ is hung the ball or weight $r$, which counterbalances the lever and its empty pan $p$, &c. Now, the lever $m$ not only serves as a straining-lever on the clamps $h'$, but also as a scale-beam or weighing-lever, and is graduated, as shown, along its long arm with graduations, preferably representing pounds, from zero to two hundred, and provided with the sliding poise $s$. On a screw projecting from the short arm of the beam-lever is the usual adjusting-ball, $m^3$.

Now, referring to Figs. 1 and 3, it will be seen that the long arm of the pivoted valve-plate $e$ projects into the spout over or toward the shot-outlet, and that the short arm projects out under the end of the beam-lever $m$, and when the plate is slid away from the shot-outlet, as shown by full lines in Fig. 1, the short arm will be raised above the lower stop, $o'$, of the beam-lever, in the path of the beam when falling toward the stop, as will be understood.

Assuming, now, that it is desired to test a specimen, the shot-outlet will of course be closed and the specimen properly inserted in the clamps, as seen in Fig. 1, after which the hand-wheel $k'$ will be revolved to screw down the lower jaw, and thus tighten the specimen in the clamps and put sufficient tension on the levers to raise the beam-lever $m$ to the upper stop, $o$, as shown in Fig. 1, and thus bring the weight-pan $p$ up under the shot-spout $d$. The valve $e$ is now opened, allowing the shot to gradually flow into the pan $p$, and thus applying force to the levers $m$ $l$ to strain the specimen $g$, which strain will gradually increase as the shot accumulates in the pan $p$ until sufficient strain is exerted to break the specimen, when the pan will suddenly fall and force the end of the lever $m$ against the valve-plate $e$, as seen in Fig. 3, and thus instantly shut the valve-plate, as indicated by dotted lines, and cut off the flow of shot. The weight of shot now in the pan multiplied by the leverage represents the exact weight at which the specimen broke, and this exact weight may be found by removing the pan $p$ and hanging it to the opposite end of the lever system upon a hook at the base of the counter-weight $r$, as indicated by dotted lines in Fig. 1. A counter-balance, $u$, (shown resting on the base in Fig. 1,) is then hooked onto the rod $p'$ in place of the pan $p$, so as to counterbalance the weight of the empty pan. The poise $s$ is now run out on the beam until the beam is balanced, when the graduation at which the poise rests will show the exact weight which broke the specimen. It will be seen that the beam is graduated up to only two hundred pounds, which is usually sufficient for most tests; but in case the strain exerted is greater than this, then one of the loose weights $v$ (shown stacked on a rack, $v'$, on the base in Fig. 1) is placed on the counter-balance $u$, as indicated by dotted lines in Fig. 1, which weights represent two hundred pounds each, so that by the use of one or more of these weights, together with the sliding poise on the beam, any desired strain greater than two hundred pounds may be weighed, as will be readily comprehended. It will therefore be now seen that this machine not only provides a means of straining and breaking the specimen, but also provides in the same mechanism means for accurately weighing the breaking-strain so applied, which is a great advantage over machines of this type heretofore, in which the means for weighing the strain were distinct from the straining mechanism. It will be readily seen that the beam-lever $m$ might be directly connected to the clamp $h'$ without the intervention of the intermediate lever, $l$, but that the lever $m$ would in that case have to be inconveniently long, which renders it preferable to employ an additional lever, $l$; and, if desired, a third lever might be used if required to increase the leverage.

It will be seen by referring to Fig. 2 that the shot-reservoir has a pivoted cover, $c'$, which may be swung open, as indicated by dotted lines, when it is desired to pour back the shot which has been run into the pan, to prepare the machine for the next test.

The entire frame of the machine, consisting of the base $a$, standard $b$, reservoir $c$, and its arm $r$, with the hooks and stops $m^2$ $l^2$ and $o$ $o'$, are all preferably made in one integral casting, by which strength and simplicity of construction are secured; but, if desired, these parts may be cast separately and fastened together.

In lieu of employing shot, any other mobile weighting material might of course be adopted; but shot is preferred.

What I claim as my invention is—

1. In a testing-machine of the kind described, the combination, with the holder or clamp in which the specimen is seized, of a straining-lever operatively connected therewith, a weighting-pan hanging thereto, and a reservoir of shot arranged to deliver into the pan, with means for shutting off the flow of shot on the breakage of the specimen and falling of the pan, the said pan being changeable from one end of the lever system to the other, and the said lever being graduated and provided with a sliding poise, whereby the strain exerted at the breakage of the specimen may be subsequently weighed through the same mechanism employed to apply the strain, substantially as herein set forth.

2. In a testing-machine, the combination, with suitable clamps in which the specimen is held, of the combined weighing and straining lever $m$, graduated and provided with a sliding poise, and operatively connected at one end with the specimen-clamp, with the changeable weight-pan $p$, adapted to be hung on either end of the lever, the counter-balance $u$, adapted to be hung on the long end of the lever in place of the weight-pan, and a reservoir of mobile weighting material arranged to discharge into the said pan, substantially as and for the purpose set forth.

3. The combination, in a testing-machine of the character described, with clamps holding the specimen, and with the reservoir $c$, spout $d$, and valve $e$, of the lever $l$, connected with the clamp, and the graduated lever $m$, coupled to the lever $l$, the poise $s$, reversible weight-pan $p$, and counter-balance $u$, arranged and operating substantially as and for the purpose set forth.

CHARLES C. MILLER.

Witnesses:
    JNO. E. GAVIN,
    CHAS. M. HIGGINS.